(No Model.) 2 Sheets—Sheet 1.
W. B. POTTER.
ELECTRIC BRAKE.
No. 560,428. Patented May 19, 1896.
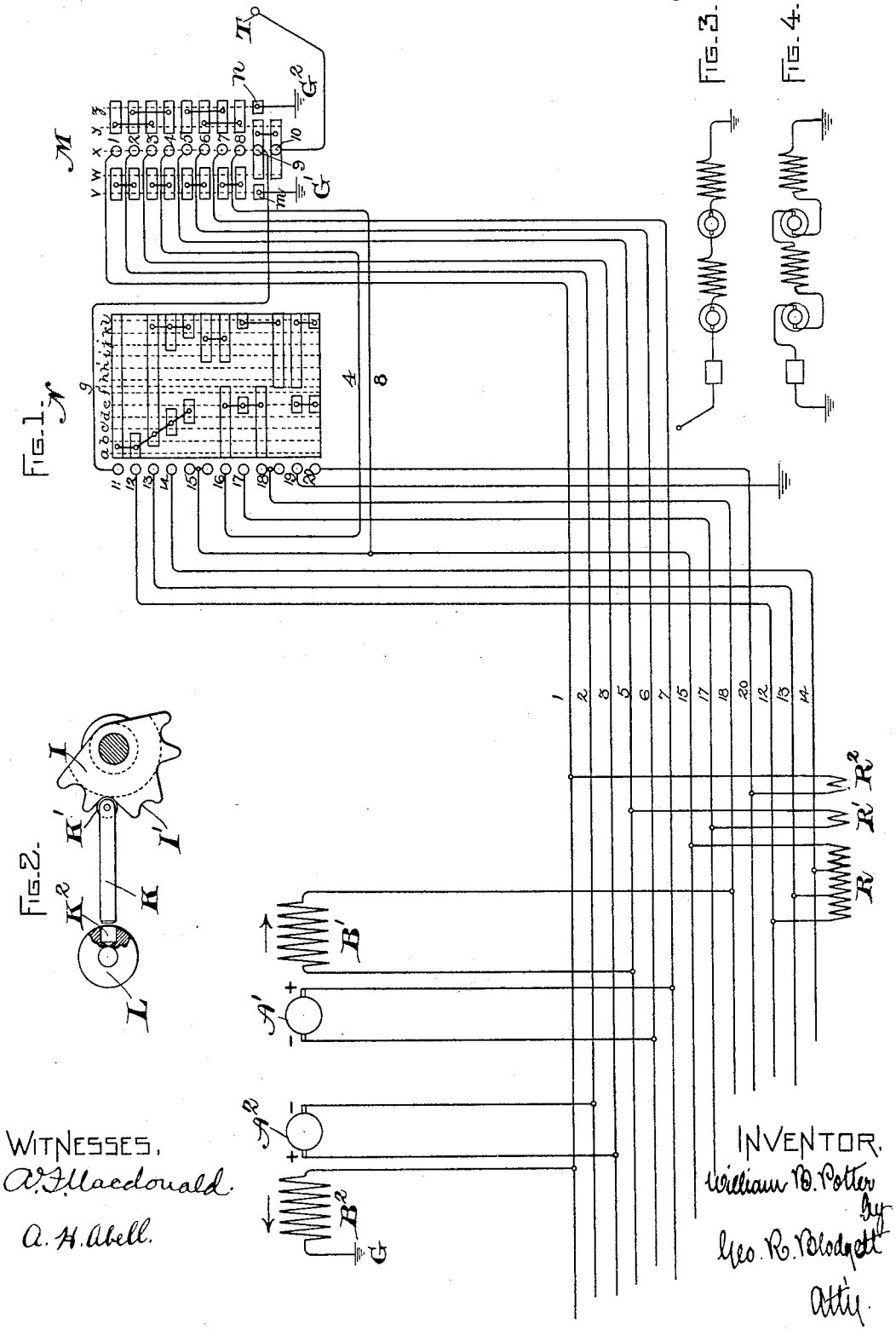
WITNESSES.
A. F. Macdonald.
A. H. Abell.
INVENTOR.
William B. Potter
by
Geo. R. Blodgett
atty.

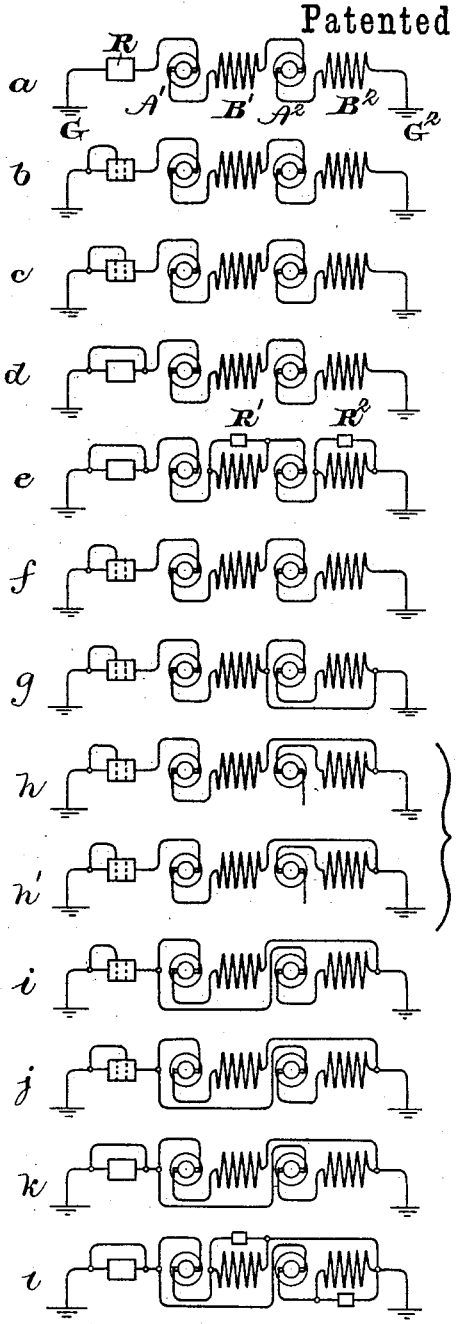

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

ELECTRIC BRAKE.

SPECIFICATION forming part of Letters Patent No. 560,428, dated May 19, 1896.

Application filed February 3, 1896. Serial No. 577,800. (No model.)

*To all whom it may concern:*

Be it known that I, WILLIAM B. POTTER, a citizen of the United States, residing at Schenectady, county of Schenectady, State of New York, have invented certain new and useful Improvements in Electric Brakes, (Case No. 290,) of which the following is a specification.

My invention relates to electric brakes, and more particularly to the now well-known emergency brakes or stops, such as that defined in my Patent No. 543,352, dated July 23, 1895, in which motors operated by the momentum of a moving vehicle or load are short-circuited while operating as generators and bring the vehicle to an abrupt stop. These contrivances are designed to be used in case of emergency and not to take the place of an ordinary electric brake or other braking appliance. They are, however, extremely severe upon the truck and motors, as well as upon passengers, and their application is to be avoided, if possible, although they afford a useful safety appliance. To obviate the disadvantages and discomforts attending these devices when used as electric brakes, I have devised my present invention, which consists, briefly, in an improved combination of reversing-switch and electric braking mechanism which may be applied to present standard equipments and may operate, if necessary, with great energy, but which may be also regulated so that the inconveniences just referred to will be obviated. For this purpose I prefer to employ a series parallel controller such as that described in my Patent No. 524,396, now well known in the art as the "K" controller. In this the combinations are from series with and without resistance into multiple with and without resistance, the progression being effected by shunting one of the motors before going into the multiple position, and increased speeds in the two positions being obtained by shunting the field-magnets, and thus reducing the strength of the motor field. This method of regulation has been found commercially effective and useful.

To accomplish the purposes of my invention, I combine with the ordinary reversing-switch illustrated and described in that patent a second set of contacts upon each side, so that there are in reality four sets of contacts although some of the first two series are extended so as to unite with the latter, and thus apparently there are only two sets, as will be more fully explained hereinafter. Two of these sets of contacts act in the ordinary manner to determine the direction of rotation of the motors, while the other two serve to disconnect the trolley-circuit and to close the circuit of the motors upon themselves, the circuit, however, being still open at the controller. When this latter circuit is closed, the apparatus acts as an electric brake, and the usual combinations of the motors in series and parallel with and without resistances and with and without the fields shunted are effected for the purpose of regulating the motors while acting as generators. It is of course understood that the auxiliary switch to which I have referred acts not only to cut off the trolley and close the circuit of the motors, but also to reverse the relation of armature and field, so that they act as generators.

The accompanying drawings show diagrammatic embodiments of my invention, Figure 1 showing the controlling-switch and auxiliary switch developed and with the circuits and motors connected therewith. Fig. 2 is an interlocking mechanism which may be employed. Figs. 3 and 4 show, respectively, the operation of the controller in its first position when regulating the motors and when operating as a brake; and Fig. 5 embraces a series of diagrams showing the braking combinations.

Referring first to Fig. 2, I is a star-wheel operating a pawl K with a friction-roller K'. L is a disk provided with a recess K², into which the pawl K is inserted by the revolution of the star-wheel or cam I. The notches of the star-wheel are upon the same radius, excepting the notch I'. When in this position the disk L is locked, the roller K' being in the notch I' and thrusting the pawl K into the notch K². The star-wheel I is mounted upon the shaft of the cylindrical switch M and the disk L upon the shaft of the controlling-switch N. The switch M has four operating positions defined by the four notches upon the same radius of the cam I; but in the central position of the switch the mechanism is locked and its circuit is open. This interlocking mechanism is explained only for clearness of illustration and is not claimed herein, inasmuch as similar devices are described and claimed in my patent above referred to, and they, in connection with the present illustration, will render the application of the interlock evident to those skilled in the art.

Referring now to Fig. 1, the brushes or fixed contacts of the switch M are numbered 1 to 10 and those of the controller N 11 to 20. The positions of the controller are indicated by the letters $a$ to $l$ and the motor combinations effected by it are shown in the diagrams of Fig. 5 by corresponding letters. It is to be understood that when the trolley-current is on the motors are combined in the position shown in Fig. 3 and other combinations, as illustrated in my patent first referred to above, which are therefore not further explained herein. The positions of the switch M are shown by the lines $v$ to $z$, respectively. The lower two contact-plates form a connection from the trolley T. Auxiliary contact-plates $m$ $n$ are connected to the ground-wire at $G'$ $G^2$. The motor-armatures are lettered, respectively, $A'$ $A^2$ and the fields $B'$ $B^2$. Resistances R $R'$ $R^2$ are also provided.

The first combination of the controller when the electric machines are operating as motors is shown in Fig. 3, the row of contacts upon the switch M standing upon the line $w$ and those upon the controller N standing upon the line $a$, its circuit being as follows: From the trolley T current passes to contact 10, by cross connection to contact 9, to contact 11 upon the controller, by cross connection to contact 12, through the resistance R to the lead 15, and by that lead to the lead 8, to contact 8 upon the switch M, to contact 7, by the lead 7 to the plus-brush of the armature $A'$, through the armature to the lead 6, to contact 6, to contact 5, by the lead 5 through the field $B'$ to lead 18, to contact 18 upon the controller, to contact 16 by the cross connection, by the lead 4 to contact 4 upon the switch M, to contact 3, by the lead 3 to the plus-brush of the armature $A^2$, through that armature to the lead 2, to contact 2, to contact 1, through the field $B^2$, and out at ground, giving the combination shown in Fig. 3. The other combinations made as the controller is rotated are described in my patent. When, however, it is desired to use the motors as an electric braking appliance, the switch M is turned so that the brushes rest upon the line $z$, including the auxiliary contact $n$, opening the trolley-circuits and closing the circuit of the motors through the ground-wire, but still leaving the local circuit open at the controller. The relation of armature and field in the motors has of course been reversed, as will be evident from the cross connection of the movable contacts upon the right of switch M. It will be observed that the reversing of the motors is accomplished by the same act as when they are to be reversed in their direction of rotation, this being so arranged because the instinctive act of the motorman in checking the car is to throw back the handle of the reversing-switch. In this combination the circuit is as follows: Starting from the contact-plate $m$, it passes to the contact 11 upon the controller, to contact 12 by the lead 12, through the resistance R, to lead 15, by that lead and lead 8 to contact 8, by the cross connection to contact 6, by the lead 6 to the armature $A'$, entering at its minus side, thence by the lead 7 to contact 7, by cross connection to contact 5, by lead 5 through the field $B'$ in the same direction as before, (the relation of armature and field being reversed, as will be observed,) to the lead 18, to the controller at contact 18, to contact 16, by lead 4 to contact 4, by cross connection to contact 2, by lead 2 to the minus-brush of the armature $A^2$, through the armature to the lead 3, to contact 3, by cross connection to contact 1, through the field $B^2$ to ground at G, completing the local circuit at $G^2$ to the contact-plate $n$, giving the combination of motors and resistances, the motors operating as generators, as shown in Fig. 4.

The other combinations of the controller are illustrated in detail in Fig. 5, the diagrams $a$ to $l$ being the various combinations of motors and resistances produced by the rotation of the controller N to the positions indicated, respectively, by those letters. They are self-evident, and the circuits will not be traced in detail, inasmuch as they are simply the same combinations reversed as those described in my patent already referred to. Briefly the first position $a$ is in series with a resistance; the second, third, and fourth, lettered $b$ $c$ $d$, respectively, are also resistance-steps, the last one being with the two machines in series and the resistance cut out. The next step $e$ shows the field shunted. $f$ is the same as position $b$. In position $g$ a shunt is thrown around one of the machines. In $h$ the shunt is open, as also in $h'$, which is meant to indicate that this being a transition-step the contacts are somewhat extended, so that it may not be passed over too abruptly. At $i$ the machines are in multiple. At $j$ an additional portion of resistance is cut out. At $k$ all of the resistance is cut out. At $l$ the fields are shunted.

Practically all of the steps after that shown at $d$ might be omitted, as it is not desired or intended that the apparatus as designed shall be used for making ordinary service stops, it being an intermediate device between the emergency-stop (the limits of which have been defined in my statement of invention) and a properly-designed electric braking apparatus, which may be continuously used. It is designed to combine with the power of the emergency-stop a few gradations, which will prevent its being so extremely severe, although in case of accident it may still be employed, the motorman rapidly passing through all of the steps necessary to bring the car to a stop, and by a single movement of the hand short-circuiting the motors. The most effective position for stopping the apparatus is that shown at *k*, in which the two motors are in multiple.

What I claim as new, and desire to secure by Letters Patent of the United States, is—

The combination of a controlling-switch arranged to connect a plurality of motors in series or in parallel with and without resistance, and an emergency-switch in the controller provided with contacts and connections arranged to open the trolley-circuit, and to close a local circuit through the motors, the local circuit being left open at the controller; by which the controller may be used as power apparatus in one position of the auxiliary switch, but in other positions will combine the motors as generators in steps in series and parallel with and without resistance.

In witness whereof I have hereunto set my hand this 31st day of January, 1896.

WILLIAM B. POTTER.

Witnesses:
B. B. HULL,
A. F. MACDONALD.